US012577816B2

(12) United States Patent
Tanaka

(10) Patent No.: US 12,577,816 B2
(45) Date of Patent: Mar. 17, 2026

(54) FORWARD/BACKWARD MOVEMENT DEVICE

(71) Applicant: HI-LEX Corporation, Hyogo (JP)

(72) Inventor: Shohei Tanaka, Hyogo (JP)

(73) Assignee: HI-LEX Corporation, Hyogo (JP)

( * ) Notice: Subject to any disclaimer, the term of this patent is extended or adjusted under 35 U.S.C. 154(b) by 37 days.

(21) Appl. No.: 18/844,992

(22) PCT Filed: Mar. 10, 2023

(86) PCT No.: PCT/JP2023/009186
§ 371 (c)(1),
(2) Date: Sep. 9, 2024

(87) PCT Pub. No.: WO2023/171779
PCT Pub. Date: Sep. 14, 2023

(65) Prior Publication Data

US 2025/0179846 A1 Jun. 5, 2025

(30) Foreign Application Priority Data

Mar. 10, 2022 (JP) ................................ 2022-037165

(51) Int. Cl.
*E05B 83/34* (2014.01)

(52) U.S. Cl.
CPC .................................... *E05B 83/34* (2013.01)

(58) Field of Classification Search
CPC .............. B60K 15/05; B60K 2015/053; B60K 2015/0561; B60K 2015/0576; E05B 83/34; E05B 81/56; E05B 81/64; E05B 17/0037; E05C 19/022; Y10T 292/088; Y10T 292/694
See application file for complete search history.

(56) References Cited

U.S. PATENT DOCUMENTS

| | | | | |
|---|---|---|---|---|
| 9,038,499 B2 * | 5/2015 | Ishiguro | .................. | E05C 19/02 220/315 |
| 9,878,613 B2 * | 1/2018 | Yang | ...................... | B60K 15/05 |
| 10,155,441 B2 * | 12/2018 | Kim | ...................... | B60K 15/05 |
| 10,683,685 B2 * | 6/2020 | Sonobe | .................... | E05B 81/28 |
| 10,691,160 B2 * | 6/2020 | Yamamoto | ............. | B60K 15/05 |
| 10,711,504 B2 * | 7/2020 | Roos | ........................ | E05B 81/20 |
| 11,479,113 B2 * | 10/2022 | Lee | ......................... | E05B 15/04 |
| 11,821,248 B2 * | 11/2023 | Lee | ......................... | E05B 81/34 |
| 11,821,254 B2 * | 11/2023 | Eggert | .................. | E05C 17/003 |
| 11,976,501 B2 * | 5/2024 | Watanabe | ............. | B60K 15/05 |

(Continued)

FOREIGN PATENT DOCUMENTS

| | | | | |
|---|---|---|---|---|
| CN | 105082986 A * | 11/2015 | ............. | B60K 15/05 |
| CN | 106869640 A * | 6/2017 | ............. | E05B 83/34 |

(Continued)

*Primary Examiner* — Steven A Tullia

(57) ABSTRACT

In a forward/backward movement device, when a forward/backward movement member moves forward, an engagement part and a to-be-engaged part are in an engaged state such that a biasing force of a biasing member is applied to a pressing force transmitting member, and when the pressing force transmitting member is positioned in a backward position, the engagement part and the to-be-engaged part are in a non-engaged state such that the biasing force of the biasing member is not applied to the pressing force transmitting member.

4 Claims, 7 Drawing Sheets

1

(56) References Cited

U.S. PATENT DOCUMENTS

| | | | | |
|---|---|---|---|---|
| 2018/0179788 | A1* | 6/2018 | Oxley | E05B 81/13 |
| 2024/0011337 | A1* | 1/2024 | Yoshida | E05B 81/34 |

FOREIGN PATENT DOCUMENTS

| | | | | | |
|---|---|---|---|---|---|
| CN | 107972481 | A | * | 5/2018 | E05B 53/00 |
| CN | 105793092 | B | * | 12/2018 | B60K 15/0409 |
| CN | 109532473 | A | * | 3/2019 | B60K 15/05 |
| IT | 201800006901 | A1 | * | 1/2020 | B60K 15/05 |
| JP | H11115496 | A | * | 4/1999 | |
| JP | 2007153155 | A | * | 6/2007 | |
| JP | 6180992 | B2 | * | 8/2017 | E05C 19/022 |
| JP | 2020-122335 | | | 8/2020 | |
| JP | 2020186608 | A | * | 11/2020 | |
| KR | 100410515 | B1 | * | 12/2003 | B60K 15/05 |
| KR | 20120137660 | A | * | 12/2012 | E05B 81/34 |
| KR | 101260217 | B1 | * | 5/2013 | B60K 15/05 |
| KR | 101567246 | B1 | * | 11/2015 | E05B 17/0029 |
| KR | 101593933 | B1 | * | 2/2016 | B60K 15/05 |
| KR | 20200099378 | A | * | 8/2020 | B60K 15/05 |
| KR | 20210095418 | A | * | 8/2021 | B60K 15/05 |
| WO | WO-2017026822 | A1 | * | 2/2017 | E05B 81/25 |
| WO | WO-2020158816 | A1 | * | 8/2020 | E05B 83/34 |
| WO | WO-2020228894 | A1 | * | 11/2020 | E05B 81/56 |

* cited by examiner

FORWARD/BACKWARD MOVEMENT DEVICE

TECHNICAL FIELD

The present invention relates to a forward/backward movement device.

BACKGROUND ART

There is known a lid opening and closing device that opens and closes a lid (fuel lid), which is a lid for closing a fuel inlet part in a vehicle in which an internal combustion engine is mounted, or a lid, which is a lid for closing an opening part for power reception in a vehicle in which a battery is mounted.

For example, as a lid opening and closing device, a device is disclosed which includes: a case that is attached to a fuel inlet part; a forward/backward movement member that moves forward and backward with respect to the case to open and close a lid; a restriction member that restricts the forward and backward movement of the forward/backward movement member; a pressing force transmitting member for actuating a detection switch for detecting the opening and closing of the lid; and a biasing member (for example, see Patent Literature (hereinafter referred to as "PLT") 1).

The pressing force transmitting member is biased in a protrusion direction (a forward direction of the forward/backward movement member) by the biasing force of the biasing member. In a case where the lid moves from an open position to a closed position, the pressing force transmitting member is pressed by the lid and moves in the backward direction against the biasing force of the biasing member.

Further, when the forward/backward movement member is pressed by the lid and moves to a backward position, the restriction member engages with the forward/backward movement member to restrict the forward and backward movement of the forward/backward movement member. In a state in which the lid has moved to the closed position, the lid is locked by latching of a lid latching part of the forward/backward movement member to a lid to-be-latched part of the lid.

CITATION LIST

Patent Literature

PTL 1

Japanese Patent Application Laid-Open No. 2020-122335

SUMMARY OF INVENTION

Technical Problem

Incidentally, in the lid opening and closing device described in PTL 1 above, in a state in which the lid has moved to the closed position, the pressing force transmitting member is biased in the protrusion direction (the forward direction of the forward/backward movement member) by the biasing force of the biasing member, and thus, the lid is pushed in the direction of from the closed position to the open position by the pressing force transmitting member. Here, when there is a gap between members (for example, a gap between the lid latching part and the lid to-be-latched part), the lid pushed by the pressing force transmitting member moves in the direction of from the closed position to the open position by the gap. In a case where the amount of movement of the lid is large, the lid conspicuously rises up from the vehicle body, and thus, the appearance is impaired. In addition, a gap which allows a tool or the like to be inserted therethrough is generated between the lid, which has risen up from the vehicle body, and the vehicle body, and thus, a problem in crime prevention also occurs.

An object of the present invention is to provide a forward/backward movement device capable of preventing a lid from rising up from a vehicle body.

Solution to Problem

A forward/backward movement device of the present invention includes: a case; a forward/backward movement member that includes one end, whose side is housed in the case, and another end, whose side protrudes from the case, moves forward in a direction from inside the case toward outside the case, and moves backward in a direction from outside the case toward inside the case; a biasing member that biases the forward/backward movement member; a movement member that is housed in the case and moves between a first position, which allows the forward/backward movement member to move forward by a biasing force of the biasing member, and a second position, in which the forward/backward movement member is stopped from moving forward; a to-be-engaged part that moves together with the forward/backward movement member inside the case; a pressing force transmitting member that moves from a forward position to a backward position by a pressing force when a lid is closed; and an engagement part that moves together with the pressing force transmitting member inside the case. When the forward/backward movement member moves forward, the engagement part and the to-be-engaged part are in an engaged state such that the biasing force of the biasing member is applied to the pressing force transmitting member, and when the pressing force transmitting member is positioned in the backward position, the engagement part and the to-be-engaged part are in a non-engaged state such that the biasing force of the biasing member is not applied to the pressing force transmitting member.

Advantageous Effects of Invention

According to the present invention, it is possible to obtain a forward/backward movement device capable of preventing a lid from rising up from a vehicle body.

BRIEF DESCRIPTION OF DRAWINGS

FIG. 4 illustrates a state of the forward/backward movement device when a fuel lid is pushed in;

FIG. 7 illustrates a state of the forward/backward movement device when the fuel lid is slightly pushed in;

FIG. 8 illustrates a state of the forward/backward movement device when the fuel lid is further pushed in;

DESCRIPTION OF EMBODIMENTS

Hereinafter, an embodiment of the present invention will be described in detail with reference to the accompanying drawings.

Configuration of Opening and Closing Device 100

Figure 1:
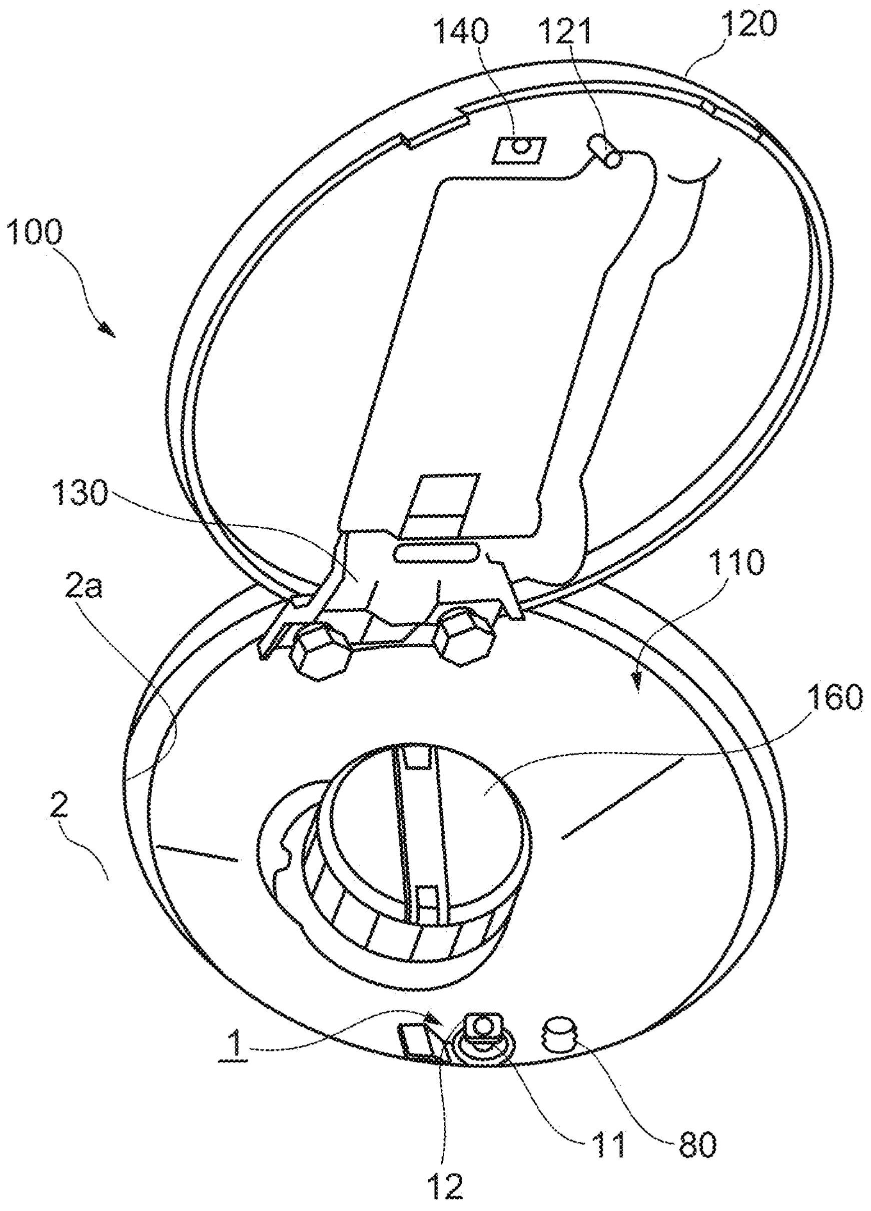
FIG. 1 illustrates an exemplary configuration of an opening and closing device including a forward/backward movement device according to an embodiment of the present invention.
Figure 2:
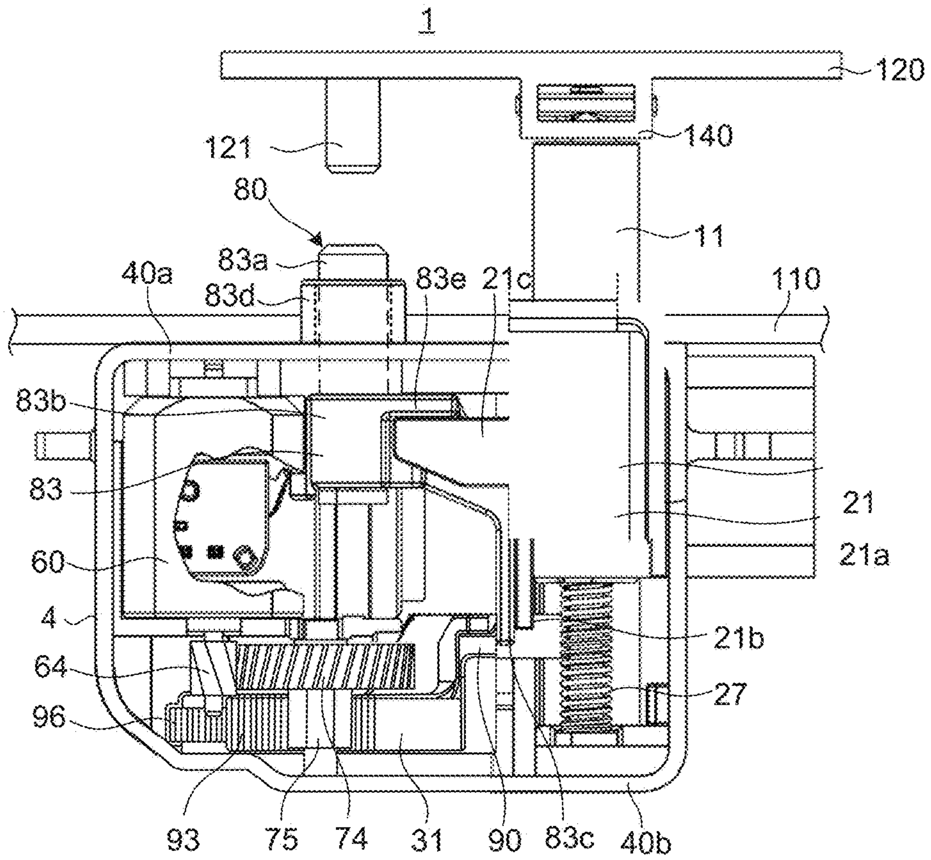
FIG. 2 illustrates an exemplary configuration of the forward/backward movement device according to the embodiment of the present invention.

FIG. 1 illustrates an exemplary configuration of opening and closing device 100 including forward/backward movement device 1 according to an embodiment of the present invention, and FIG. 2 illustrates an exemplary configuration of forward/backward movement device 1 according to the embodiment of the present invention.

Opening and closing device 100 is a device that opens and closes fuel lid 120 which is a lid for closing fuel inlet part 2*a* provided in vehicle body 2. Opening and closing device 100 includes forward/backward movement device 1 according to the embodiment of the present invention. Note that, details of the configuration of forward/backward movement device 1 will be described later.

Opening and closing device 100 includes body 110 attached to fuel inlet part 2*a* provided in vehicle body 2, fuel lid 120, hinge 130 for rotatably supporting fuel lid 120, and forward/backward movement device 1.

Body 110 constitutes, for example, a fuel chamber surrounding a fuel pipe. Note that, a fuel inlet port formed at a leading end of the fuel pipe is closed by screw cap 160.

Forward/backward movement member 11 is a member for opening fuel lid 120. A leading end of forward/backward movement member 11 is provided with lid latching part 12.

In opening and closing device 100 configured in the above-described manner, when fuel lid 120 is closed, lid to-be-latched part 140 provided in fuel lid 120 comes into contact with forward/backward movement member 11. At this time, lid latching part 12 provided in forward/backward movement member 11 is inserted into lid to-be-latched part 140.

When fuel lid 120 is pushed in in this state, forward/backward movement member 11 moves backward inside vehicle body 2. "Move backward" means that forward/backward movement member 11 moves from outside a case to be described later toward inside the case.

Further, when forward/backward movement member 11 moves backward, lid latching part 12 rotates and lid latching part 12 is latched to lid to-be-latched part 140. When lid latching part 12 is latched to lid to-be-latched part 140, forward/backward movement member 11 is positioned in a backward position.

The backward position is a stop position of forward/backward movement member 11 that has moved backward. The backward position is also a position in which fuel lid 120 is held in the closed state.

Insertion of restriction member 90 to be described later into a recessed part of forward/backward movement member-side member 21, which will be described later, in this state results in a state in which the movement of forward/backward movement member 11 which is held by forward/backward movement member-side member 21 is restricted, that is, a state in which forward/backward movement member 11 is locked. Thus, fuel lid 120 is locked in a state in which fuel inlet part 2*a* is closed.

When forward/backward movement member 11 transitions to the unlocked state from the locked state by restriction member 90 described above in order to open fuel lid 120, forward/backward movement member 11 moves forward outside vehicle body 2. "Move forward" means that forward/backward movement member 11 moves from inside the case to be described later toward outside the case.

At this time, lid latching part 12 provided in forward/backward movement member 11 rotates, and thus, the latching of lid latching part 12 to lid to-be-latched part 140 is released. Thus, lid latching part 12 comes out of lid to-be-latched part 140, and fuel lid 120 is allowed to be opened.

Pressure force transmitting part 80 includes a regulation part, a guide part, and the like. Details of the regulation part, the guide part, and the like will be described later.

Configuration of Forward/Backward Movement Device 1

Next, the configuration of forward/backward movement device 1 will be described with reference to FIGS. 2 and 3.

Forward/backward movement device 1 illustrated in FIG. 2 is a device that moves forward/backward movement member 11 forward or backward with respect to case 4. Forward/backward movement device 1 includes case 4, forward/backward movement member 11, forward/backward movement member-side member 21, biasing member 27, movement member 31, driving part 60, and regulation part 83.

Forward/Backward Movement Member 11

Forward/backward movement member 11 is a columnar or cylindrical member capable of moving forward and backward with respect to case 4. Forward/backward movement member 11 is inserted into a through-hole (not illustrated) formed in front-side wall part 40*a*.

Forward/backward movement member 11 moves between a forward position, in which forward/backward movement member 11 has moved forward with respect to case 4, and a backward position, in which forward/backward movement member 11 has moved backward with respect to case 4. The forward position is a stop position of forward/backward movement member 11 that has moved forward. The forward position is also a position of forward/backward movement member 11 when the latching of lid latching part 12 to lid to-be-latched part 140 as illustrated in FIG. 1 is released.

Forward/Backward Movement Member-Side Member 21

Forward/backward movement member-side member 21 is fitted to forward/backward movement member 11 in a relatively rotatable manner, and moves together with forward/backward movement member 11. Forward/backward movement member-side member 21 includes regulation member 21*a*, to-be-engaged member 21*b*, and to-be-engaged member 21*c* (corresponding to the "to-be-engaged part" in the present invention).

Regulation Member 21*a*

Regulation member 21*a* regulates the forward position and the backward position of forward/backward movement member 11 by moving within case 4 while rotatably holding forward/backward movement member 11.

Regulation member 21*a* is disposed in a region between front-side wall part 40*a* and back-side wall part 40*b* of case 4. Regulation member 21*a* regulates the movement of forward/backward movement member 11 in the forward direction by coming into contact with front-side wall part 40*a*. Further, regulation member 21*a* regulates the movement of forward/backward movement member 11 in the backward direction by coming into contact with back-side wall part 40*b*.

To-Be-Engaged Member 21*b*

To-be-engaged member 21*b* regulates the forward movement of regulation member 21*a* by restriction member 90 engaging with to-be-engaged member 21*b*. For this reason, a recessed part with which restriction member 90 engages is formed in to-be-engaged member 21*b*. Details of the recessed part will be described later.

To-be-engaged member 21*b* extends from regulation member 21*a* toward back-side wall part 40*b*. To-be-engaged member 21*b* is provided adjacent to regulation member 83*c* and parallel to regulation member 83*c*.

To-Be-Engaged Member 21*c*

To-be-engaged member 21*c* extends from regulation member 21*a* toward internal member 83*b*. In FIG. 2, in a case where it is assumed that the direction in which forward/backward movement member 11 moves from the backward position toward the forward position is the up direction and the direction in which forward/backward movement member 11 moves from the forward position toward the backward position is the down direction, to-be-engaged member 21*c* is disposed in a position downward from engagement member 83*e* (corresponding to the "engagement part" in the present invention), which extends from internal member 83*b* toward regulation member 21*a*, in the down direction. To-be-engaged member 21*c* illustrated in FIG. 2 is in a state of being engaged with engagement member 83*e*. That is, no gap in the up-down direction is generated between to-be-engaged member 21*c* and engagement member 83*e*. The movement of to-be-engaged member 21*c* in the down direction with respect to engagement member 83*e* in this state generates a gap in the up-down direction between to-be-engaged member 21*c* and engagement member 83*e*, and causes to-be-engaged member 21*c* and engagement member 83*e* to be in a non-engaged state with each other. Even when to-be-engaged member 21*c* and engagement member 83*e* are in the non-engaged state with each other, on the other hand, the movement of to-be-engaged member 21*c* in the up direction with respect to engagement member 83*e* causes to-be-engaged member 21*c* and engagement member 83*e* to be in an engaged state with each other. Note that, details of the case where to-be-engaged member 21*c* and engagement member 83*e* are in the engaged state with each other, and details of the case where to-be-engaged member 21*c* and engagement member 83*e* are in the non-engaged state with each other will be described later. Note that, to-be-engaged member 21 is provided in forward/backward movement member-side member 21, but can also be directly provided in forward/backward movement member 11 as long as to-be-engaged member 21 can move forward and backward by following the movement of forward/backward movement member 11.

Biasing Member 27

Biasing member 27 is a coil spring that generates a biasing force for moving forward/backward movement member 11 disposed in the backward position toward the forward position.

Biasing member 27 is disposed, for example, in a region between forward/backward movement member-side member 21 and back-side wall part 40*b* inside case 4. One end of biasing member 27 is attached to a spring seat provided inside forward/backward movement member-side member 21, and the other end of biasing member 27 is attached to a spring seat provided in back-side wall part 40*b* of case 4.

Note that, biasing member 27 is not limited to a coil spring, but may be an elastic member that generates a biasing force for moving forward/backward movement member 11, and may be a leaf spring or the like.

Regulation Part 83

Regulation part 83 includes pressing force transmitting member 83*a*, internal member 83*b*, regulation member 83*c*, and engagement member 83*e*.

Pressing Force Transmitting Member 83*a*

Pressing force transmitting member 83*a* is pushed in by projection 121 provided in fuel lid 120 when fuel lid 120 is closed. Pressing force transmitting member 83*a* is a member for transmitting a pressing force of when fuel lid 120 is closed, to regulation member 83*c*. Further, pressing force transmitting member 83*a* can be used as a member for operating a detection switch which is provided inside case 4 and detects the open/closed state of fuel lid 120. For example, when pressing force transmitting member 83*a* is pushed in by projection 121 of fuel lid 120, it is possible to operate the detection switch via internal member 83*b* which is pushed in together with pressing force transmitting member 83*a*.

Pressing force transmitting member 83*a* is formed in a pillar shape so as to be insertable into guide part 83*d* formed in front-side wall part 40*a* of case 4. Pressing force transmitting member 83*a* is fixed to internal member 83*b* and protrudes outside case 4 from internal member 83*b* via guide part 83*d* which is formed in front-side wall part 40*a* of case 4 and guides the forward and backward movement of pressing force transmitting member 83*a*.

As illustrated in FIG. 2, when fuel lid 120 is opened, pressing force transmitting member 83*a* moves to a protrusion position (corresponding to the "forward position" in the present invention) in which pressing force transmitting member 83*a* protrudes outside case 4. Pressing force transmitting member 83*a* illustrated in FIG. 2 is not pushed in by projection 121. A gap is generated between pressing force transmitting member 83*a* and projection 121 provided in fuel lid 120. Note that, the forward position of pressing force transmitting member 83*a* may be, in addition to the protrusion position in which pressing force transmitting member 83*a* protrudes outside case 4, a position in which pressing force transmitting member 83*a* does not protrude from case 4 as long as pressing force transmitting member 83*a* can be pushed in by projection 121 when fuel lid 120 is closed.

Figure 9:
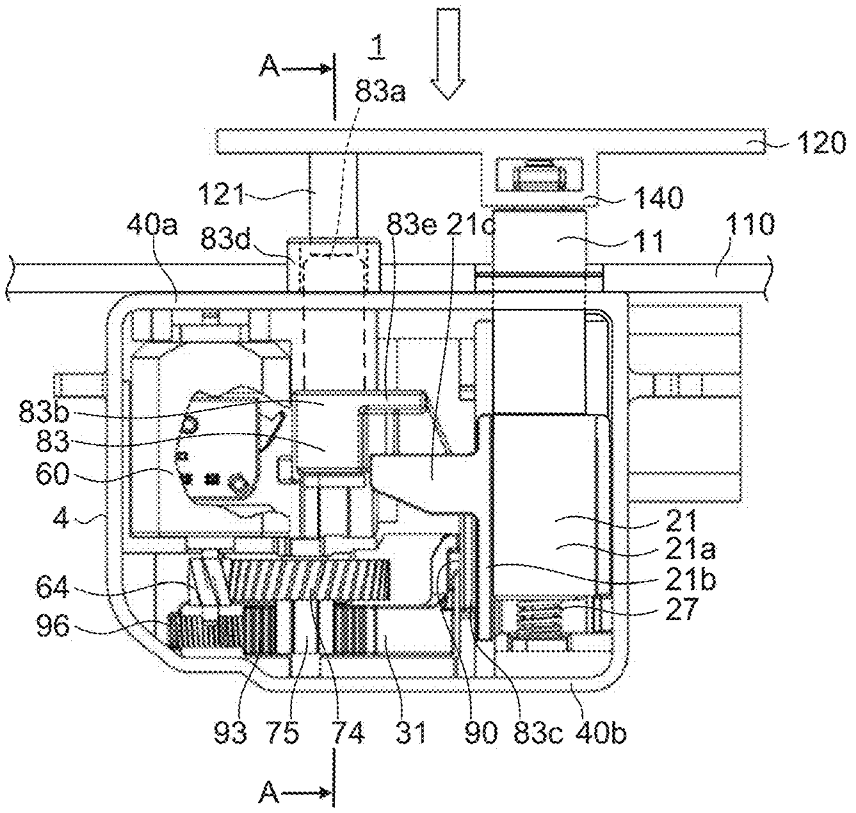
FIG. 9 illustrates a state of the forward/backward movement device when a push-in operation of the fuel lid is completed.

As illustrated in FIG. 9, when fuel lid 120 is closed, pressing force transmitting member 83*a* moves to a retraction position (corresponding to the "backward position" in the present invention) in which pressing force transmitting member 83*a* is pushed in by projection 121 provided in fuel lid 120.

Internal Member 83*b*

Internal member 83*b* is a member that is, inside case 4, fitted to pressing force transmitting member 83*a* and is disposed so as to be movable together with pressing force transmitting member 83*a*. Internal member 83*b* is disposed, for example, on a guide groove provided inside case 4.

When fuel lid 120 illustrated in FIG. 1 is closed, internal member 83*b* moves in the direction from front-side wall part 40*a* toward back-side wall part 40*b,* and when fuel lid 120 is opened, internal member 83*b* moves in the direction from back-side wall part 40*b* toward front-side wall part 40*a*. The forward position of internal member 83*b* is regulated by internal member 83*b* coming into contact with case 40, for example, front-side wall part 40*a.*

Regulation Member 83*c*

Regulation member 83*c* is a member that moves together with pressing force transmitting member 83*a* and regulates the movement of restriction member 90 included in movement member 31 when pressing force transmitting member 83*a* is pushed in inside case 4 by the transition of fuel lid 120 to the closed state. Regulation member 83*c* extends from internal member 83*b* toward back-side wall part 40*b* of case 4. Details of the configuration of the regulation member will be described later.

A leading-end part of regulation member 83*c* is formed in a hook shape. In addition, recessed part 83*c*1 is formed in regulation member 83*c.*

Engagement Member 83*e*

Engagement member 83*e* extends from internal member 83*b* toward regulation member 21*a*. Engagement member 83*e* is disposed in a position upward from to-be-engaged member 21*c,* which extends from regulation member 21*a* toward internal member 83*b,* in the up direction in FIG. 2. Note that, details of the case where engagement member 83*e* and to-be-engaged member 21*c* are in the engaged state with each other, and details of the case where engagement member 83*e* and to-be-engaged member 21*c* are in the non-engaged state with each other will be described later. Further, the biasing force of biasing member 27, which is transmitted from forward/backward movement member 11 to pressing force transmitting member 83*a* when engagement member 83*e* and to-be-engaged member 21*c* are in the engaged state with each other, will also be described later.

Seal Member 83*f*

Figure 5:
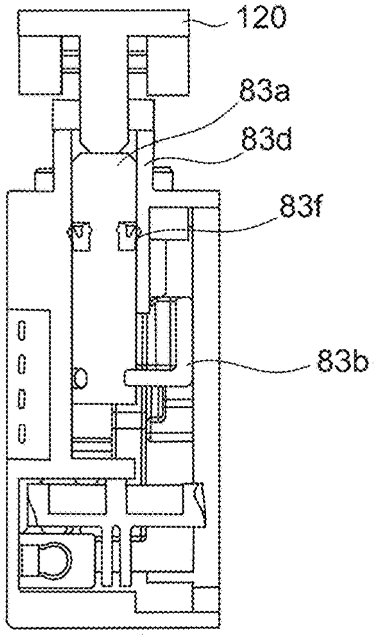
FIG. 5 is a cross-sectional view taken along line A-A of FIG. 9.

FIG. 5 is a cross-sectional view of the forward/backward movement device illustrated in FIG. 9, taken along line A-A of FIG. 9. The forward/backward movement device illustrated in FIG. 9 is the same device as the forward/backward movement device illustrated in FIG. 2. As illustrated in FIG. 5, seal member 83*f* is provided between pressing force transmitting member 83*a* and guide part 83*d.* Seal member 83*f* is a seal member having elasticity, and applies a frictional resistance to pressing force transmitting member 83*a* by a restoring force due to deformation. In a case where an external force (the biasing force of biasing member 27 transmitted from forward/backward movement member 11 to pressing force transmitting member 83*a* in the present embodiment) does not act on pressing force transmitting member 83*a,* pressing force transmitting member 83*a* is held in a stop position by a balance between a force in the down direction (for example, gravity) on pressing force transmitting member 83*a* in FIG. 5 and a force in the up direction due to the frictional resistance on pressing force transmitting member 83*a* in FIG. 5. For this reason, the material, shape, and size of seal member 83*f,* the number of seal members 83*f,* and the arrangement of seal member(s) 83*f* are set such that pressing force transmitting member 83*a* can be held in the stop position. Further, seal member 83*f* may be a member having wear resistance, water resistance, oil resistance, workability, and/or the like in addition to elasticity. Thus, seal member 83*f* can prevent the intrusion of rainwater, oil, dust, and/or the like that attempts to enter case 4 from outside case 4 by passing through a gap between pressing force transmitting member 83*a* and guide part 83*d.*

Driving Part 60

Driving part 60 is a motor that generates a driving force for moving restriction member 90. Rotation gear 64 is connected to a rotation shaft of driving part 60.

Figure 3:
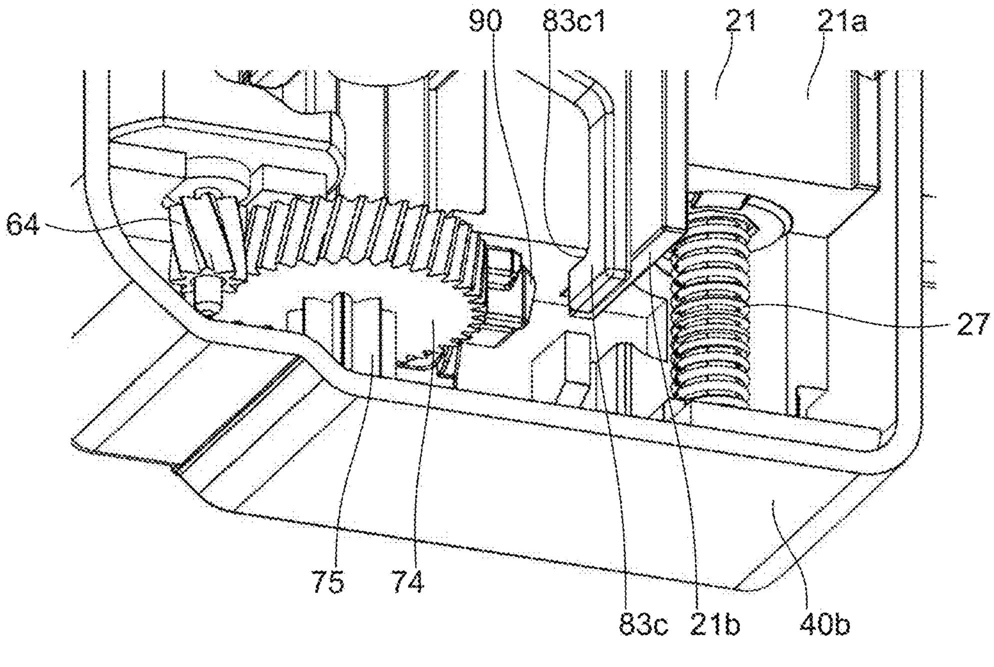
FIG. 3 illustrates an enlarged view of a portion of the forward/backward movement device when a driving part is driven.

Driving part 60 is driven, and thus, a leading-end part of restriction member 90 faces, in a position away from the leading-end part of regulation member 83*c* by a certain distance, the leading-end part of regulation member 83*c* as illustrated in FIG. 3. Thus, the engaged state between forward/backward movement member-side member 21 and restriction member 90 is released, which results in a state in which fuel lid 120 can be unlocked.

Figure 4:
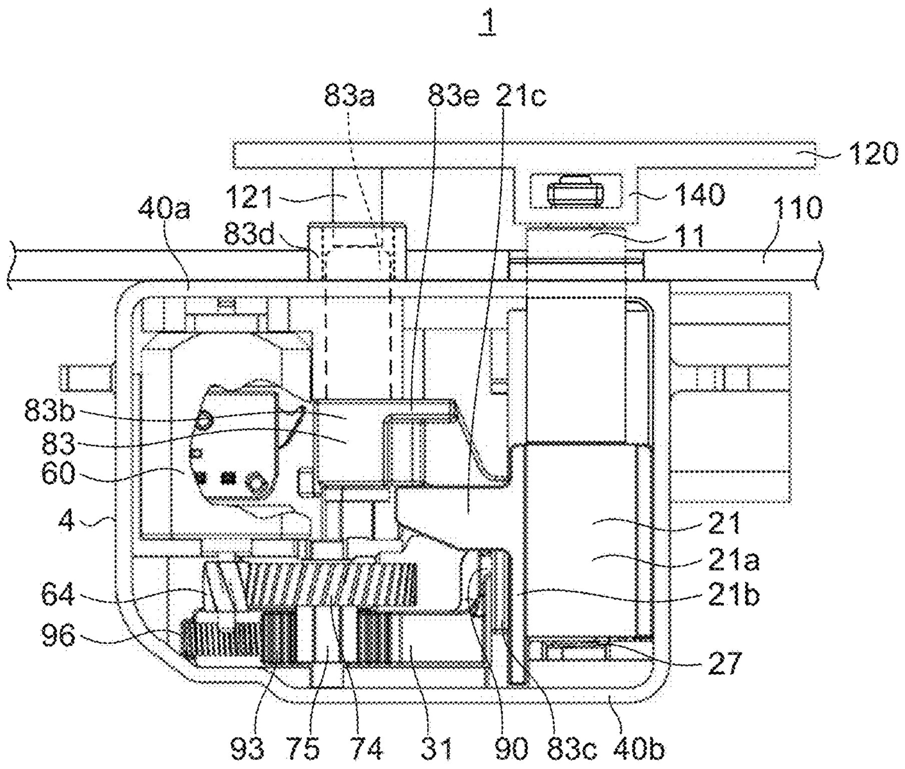
Figure 6:
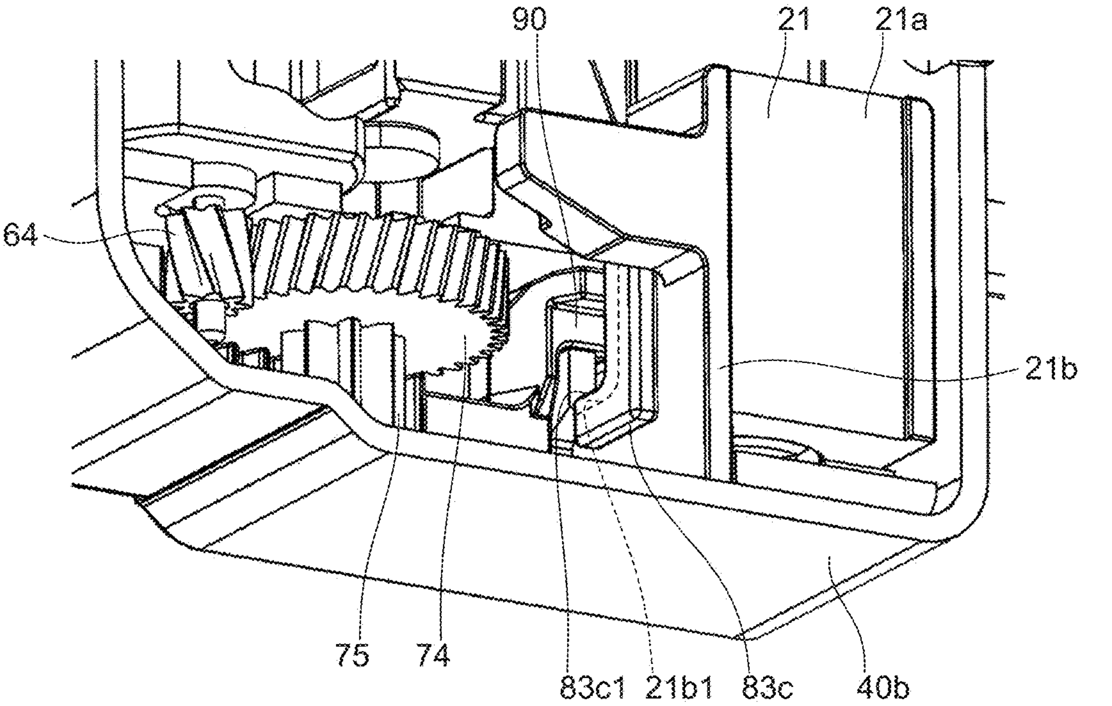
FIG. 6 illustrates an enlarged view of a portion of the forward/backward movement device illustrated in FIG. 4.

In a state in which fuel lid 120 is open, the leading-end part of restriction member 90 is in contact with to-be-engaged member 21*b* and/or restriction member 83*c* as illustrated in FIG. 2. Further, when driving part 60 is driven, the leading-end part of restriction member 90 faces, in the position away from the leading-end part of regulation member 83*c* by a certain distance, the leading-end part of regulation member 83*c* as illustrated in FIG. 3. As described above, the movement of restriction member 90 from a first position to a second position illustrated in FIG. 4 is regulated. Accordingly, in the position (first position) of restriction member 90 illustrated in FIGS. 2 and 3, restriction member 90 is not inserted into recessed part 21*b*1 provided in to-be-engaged member 21*b* (non-engaged state) and the movement of forward/backward movement member 11 is not restricted by restriction member 90, and thus, forward/backward movement member 11 can move forward. Note that, the second position is equal to a position of restriction member 90 when the leading end of restriction member 90 is engaged with recessed part 21*b*1 which is provided in to-be-engaged member 21*b* and is illustrated in FIG. 6.

Movement Member 31

As illustrated in FIGS. 2 and 3, movement member 31 includes rotation gear 74, rack gear 93, restriction member 90, and biasing member 96.

Rotation Gear 74

Rotation gear 74 is a circular gear. Rotation gear 74 is a rotational force transmitting member that transmits a rotational force generated by a motor or manually, and moves movement member 31 by the rotational force.

Rotation gear 74 is an example of a transmission member that transmits the rotational force of driving part 60 by meshing with rotation gear 64, and moves restriction member 90 by the rotational force. Rotation gear 74 is provided with pinion 75 coaxially with rotation gear 74. Pinion 75 meshes with rack gear 93 formed in restriction member 90.

Biasing Member 96

Biasing member 96 is disposed, for example, within case 4, in a region between restriction member 90 and a projection formed on the inner side of back-side wall part 40*b* of case 4 (a portion protruding from an inner side surface wall of case 4 in the direction perpendicular to the paper surface in FIG. 2). One end of biasing member 96 faces restriction member 90, and the other end of biasing member 96 faces the projection formed in back-side wall part 40*b* of case 4.

Biasing member 96 is a coil spring that generates a biasing force for moving restriction member 90 disposed in the first position toward the second position illustrated in FIG. 4 or 9.

Note that, biasing member 96 is not limited to a coil spring, but may be an elastic member that generates a biasing force for moving restriction member 90, and may be a leaf spring or the like.

Restriction Member 90 and Rack Gear 93

Restriction member 90 is a member that is housed inside case 4 illustrated in FIG. 2 and moves between the first position and the second position. Restriction member 90 can move from the first position to the second position by the biasing force generated by biasing member 96.

Note that, in addition to the biasing force generated by biasing member 96, restriction member 90 can also be moved by utilizing a rotational force generated by a driving mechanism (not illustrated) when operated manually.

In restriction member 90, rack gear 93 is formed. Rack gear 93 is a gear for converting a rotational motion into a linear motion.

Rotation gear 74 that meshes with rack gear 93 rotates, and thus, restriction member 90 moves between the first position and the second position.

The first position is a position that allows forward/backward movement member 11 to move forward. In a case where restriction member 90 is disposed in the first position, restriction member 90 is not engaged with recessed part 21*b*1 which is formed in to-be-engaged member 21*b* and is illustrated in FIG. 6. For this reason, forward/backward movement member 11 disposed in the backward position can move forward by the biasing force generated by biasing member 27 illustrated in FIG. 2.

The second position is a position in which forward/backward movement member 11 illustrated in FIG. 2 is stopped from moving forward. The second position is equal to a position of restriction member 90 when the leading-end part of restriction member 90 illustrated in FIG. 6 is engaged with recessed part 21*b*1 provided in to-be-engaged member 21*b*.

As described above, in a case where restriction member 90 is disposed in the second position, restriction member 90 is engaged with recessed part 21*b*1 formed in to-be-engaged member 21*b*, and thus, forward/backward movement member 11 stops in the backward position and cannot move forward.

Operation of Forward/Backward Movement Device 1

Next, the operation of forward/backward movement device 1 when fuel lid 120 is closed will be described with reference to FIGS. 2, 3, 4 and 6. FIGS. 2, 3, 4 and 6 are diagrams provided for describing the operation of forward/backward movement device 1 when fuel lid 120 is closed. FIG. 4 illustrates a state of forward/backward movement device 1 when fuel lid 120 is pushed in and forward/backward movement member 11 moves further backward from the backward position in the backward direction, and FIG. 6 illustrates an enlarged view of a portion of forward/backward movement device 1 illustrated in FIG. 4.

FIG. 2 illustrates a state of forward/backward movement device 1 before fuel lid 120 is pushed in.

When fuel lid 120 is not pushed in, forward/backward movement member 11 is disposed in the forward position by the biasing force generated by biasing member 27. Further, when pressing force transmitting member 83*a* is not pushed in by projection 121 provided in fuel lid 120, pressing force transmitting member 83*a* is disposed in the protrusion position (forward position) in which pressing force transmitting member 83*a* protrudes outside case 4 from internal member 83*b*.

At this time, engagement member 83*e*, which extends from internal member 83*b* toward regulation member 21*a*, and to-be-engaged member 21*c*, which extends from regulation member 21*a* toward internal member 83*b*, are in the engaged state of being engaged with each other, and thus, the biasing force generated by biasing member 27 is transmitted from forward/backward movement member 11 to pressing force transmitting member 83*a*.

Further, as illustrated in FIG. 2, the leading-end part of restriction member 90 is in contact with the leading-end part (a portion lower than the portion provided with recessed part 83*c*) of regulation member 83*c*. For this reason, the movement of restriction member 90 from the first position to the second position is regulated.

When fuel lid 120 is pushed in in this state, forward/backward movement member 11 moves in the backward direction against the biasing force generated by biasing member 27. When fuel lid 120 is slightly pushed in, forward/backward movement member 11 starts moving in the backward direction against the biasing force generated by biasing member 27.

Figure 7:
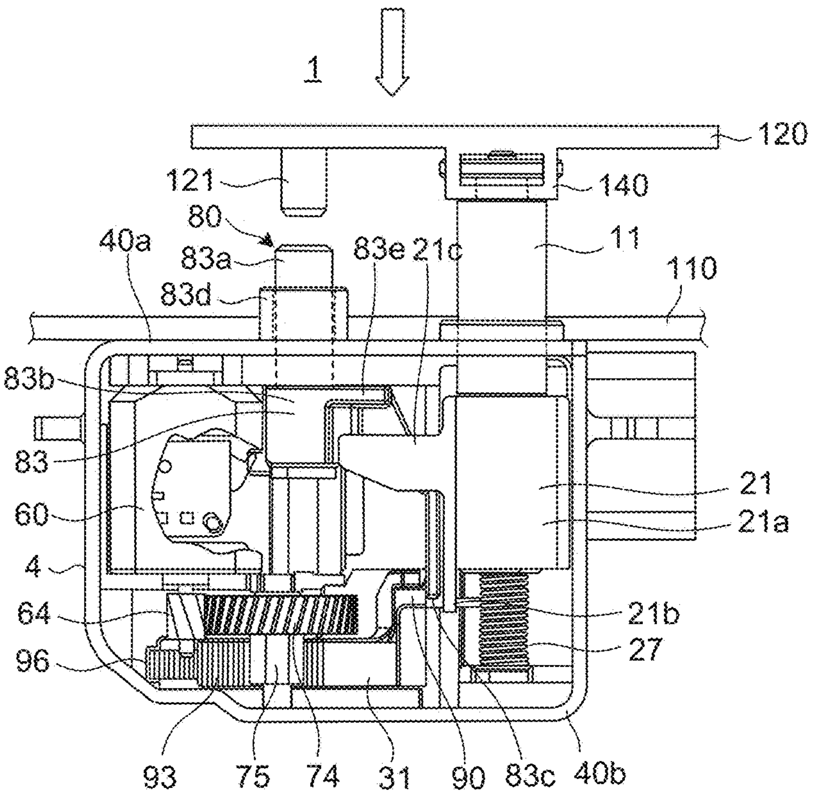

When forward/backward movement member 11 moves in the backward direction, forward/backward movement member-side member 21 moves together with forward/backward movement member 11 in the backward direction. Further, to-be-engaged member 21*c* that extends from regulation member 21*a* toward internal member 83*b* moves together with forward/backward movement member 11 in the backward direction. FIG. 7 illustrates a state of forward/backward movement device 1 when fuel lid 120 is slightly pushed in. The push-in direction is indicated by a hollow arrow in FIG. 7. In a state in which fuel lid 120 is slightly pushed in, pressing force transmitting member 83*a* is still not pushed in by projection 121 provided in fuel lid 120, and thus, pressing force transmitting member 83*a* is held in the stop position by the frictional resistance applied by seal member 83*f* (see FIG. 5) provided between pressing force transmitting member 83*a* and guide part 83*d*. That is, pressing force transmitting member 83*a* stands still in the protrusion position (forward position). In the same manner, engagement member 83*e* that extends from internal member 83*b* toward regulation member 21*a* stands still.

Given the above, in a state in which fuel lid 120 is slightly pushed in, to-be-engaged member 21*c* moves in the backward direction, whereas engagement member 83*e* stands still, and thus, a gap is generated between engagement member 83*e* and to-be-engaged member 21*c*, which results in the non-engaged state between engagement member 83*e* and to-be-engaged member 21*c* that are not engaged with each other. Thus, the biasing force generated by biasing member 27 is not transmitted from forward/backward movement member 11 to pressing force transmitting member 83*a*.

In a case where fuel lid 120 is further pushed in, forward/backward movement member 11 moves in the backward direction against the biasing force generated by biasing member 27. To-be-engaged member 21*c* moves in the backward direction, whereas engagement member 83*e* stands still, and thus, the gap between engagement member 83*e* and to-be-engaged member 21*c* widens.

Figure 8:
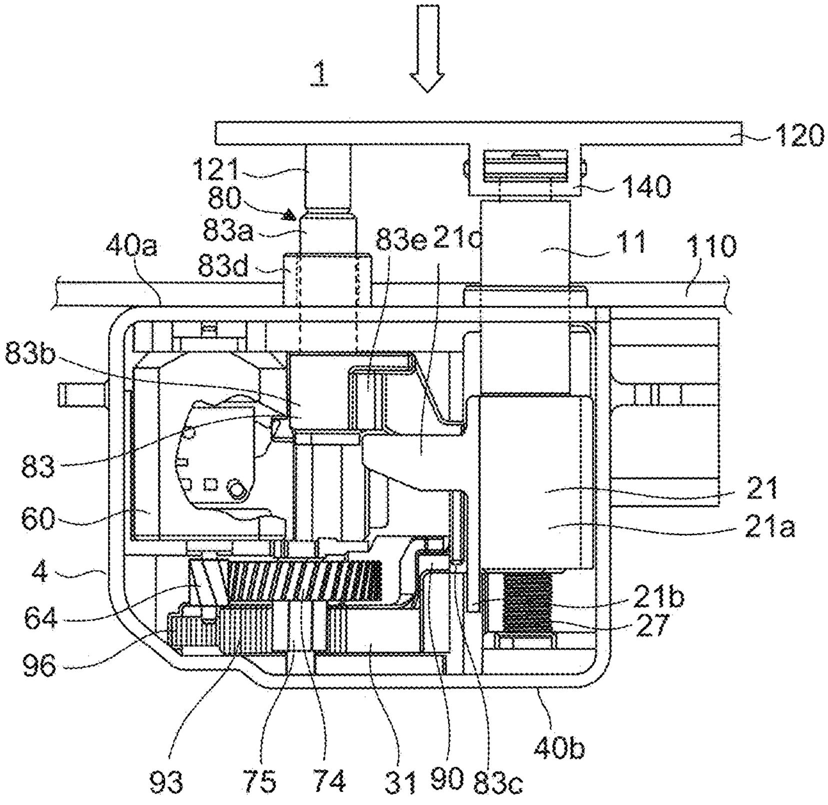

FIG. 8 illustrates a state of forward/backward movement device 1 when fuel lid 120 is further pushed in. The push-in direction is indicated by a hollow arrow in FIG. 8. In a case where fuel lid 120 is further pushed in, forward/backward movement member 11 moves in the backward direction against the biasing force generated by biasing member 27. Further, pressing force transmitting member 83*a* is pushed in by projection 121 provided in fuel lid 120, and thus, pressing force transmitting member 83*a* moves in the backward direction. That is, both forward/backward movement member 11 and pressing force transmitting member 83*a* move in the backward direction. When both forward/backward movement member 11 and pressing force transmitting member 83*a* move in the backward direction, the gap between engagement member 83*e* and to-be-engaged member 21*c* is kept constant.

FIG. 4 illustrates forward/backward movement device 1 when fuel lid 120 is further pushed in. In a case where fuel lid 120 is further pushed in, pressing force transmitting member 83*a* is pushed in by projection 121 provided in fuel lid 120 and moves in the direction from front-side wall part 40*a* of case 4 to back-side wall part 40*b* of case 4, and thus, the leading-end part of regulation member 83*c* moves so as to approach the back-side wall part 40*b* of case 4. When the leading-end part of regulation member 83*c* approaches the back-side wall part 40*b* of case 4, the leading-end part of restriction member 90 which is pushed by the biasing force generated by biasing member 96 is inserted into recessed part 83*c*1 which is formed in regulation member 83*c* and is illustrated in FIG. 6. Further, the leading-end part of restriction member 90 passes through recessed part 83*c*1 of regulation member 83*c*, and is then inserted into recessed part 21*b*1 formed in to-be-engaged member 21*b*. Note that, the position of the leading-end part of restriction member 90 at this time is equal to the second position.

Further, when fuel lid 120 is further pushed in and forward/backward movement member 11 moves backward, lid latching part 12 rotates and is latched to lid to-be-latched part 140.

As described above, as illustrated in FIGS. 2, 4, 7, and 8, in a case where fuel lid 120 is closed, to-be-engaged member 21*c* moves a longer distance than engagement member 83*e*, and thus, a gap is generated between engagement member 83*e* and to-be-engaged member 21*c*, and engagement member 83*e* and to-be-engaged member 21*c* are in the non-engaged state with each other when forward/backward movement member 11 is positioned in the backward position.

Figure 10:
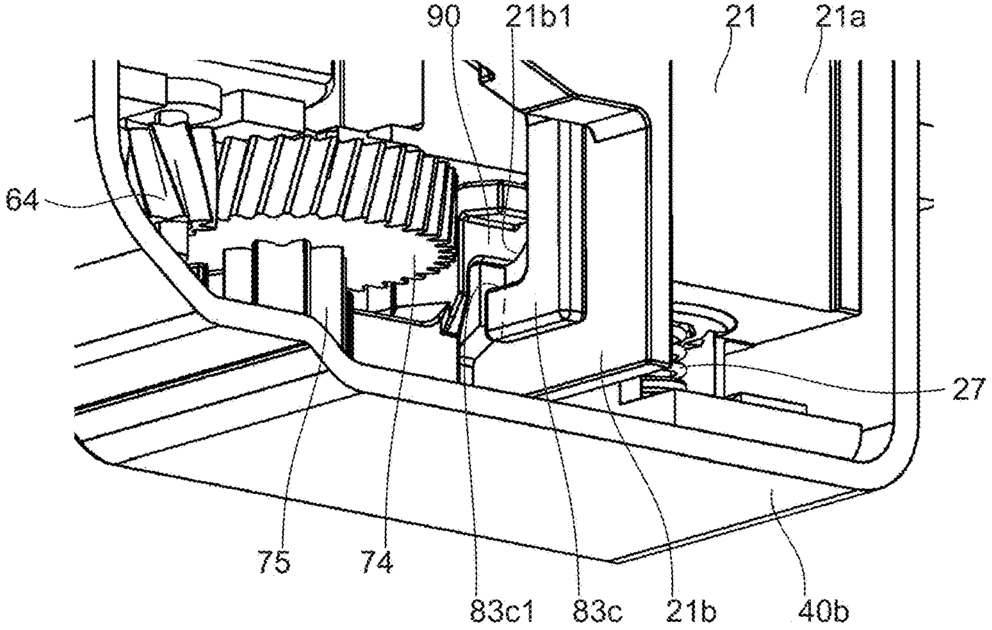
FIG. 10 illustrates an enlarged view of a portion of the forward/backward movement device illustrated in FIG. 9.

FIG. 9 illustrates a state of forward/backward movement device 1 when a push-in operation of fuel lid 120 is completed, and FIG. 10 illustrates an enlarged view of a portion of forward/backward movement device 1 illustrated in FIG. 9. The push-in direction is indicated by a hollow arrow in FIG. 9.

When the push-in of fuel lid 120 is completed, forward/backward movement member 11 attempts to move in the forward direction by the biasing force generated by biasing member 27, but the movement of forward/backward movement member 11 is restricted since the leading-end part of restriction member 90 is inserted into recessed part 21*b*1 formed in to-be-engaged member 21*b* and engages with recessed part 21*b*1.

That is, forward/backward movement member 11 is in the locked state. Thus, fuel lid 120 is locked in a state in which fuel inlet part 2*a* is closed.

Further, when forward/backward movement member 11 moves in the forward direction by the biasing force generated by biasing member 27, the gap between engagement member 83*e* and to-be-engaged member 21*c* becomes narrower than the gap therebetween illustrated in FIG. 4, but the biasing force generated by biasing member 27 is not transmitted from forward/backward movement member 11 to pressing force transmitting member 83*a* since engagement member 83*e* and to-be-engaged member 21*c* are still in the non-engaged state with each other. At this time, pressing force transmitting member 83*a* is held in the stop position by the frictional resistance applied by seal member 83*f* (see FIG. 5) provided between pressing force transmitting member 83*a* and guide part 83*d*.

Further, in a state in which the push-in of fuel lid 120 is completed, the biasing force generated by biasing member 27 is not transmitted from forward/backward movement member 11 to pressing force transmitting member 83*a*, and thus, fuel lid 120 is not pushed in a direction of opening from the position thereof in the closed state (closed position) by the pressing force transmitting member. Fuel lid 120 is held in the closed position.

In addition, as illustrated in FIG. 10, the leading-end part of restriction member 90, which is inserted into recessed part 83*c*1 of regulation member 83*c*, is inserted into recessed part 21*b*1 formed in to-be-engaged member 21*b* without coming into contact with regulation member 83*c*. Since the movement of regulation member 21*a* in the forward direction is restricted thereby, it is possible to maintain the state in which fuel lid 120 is closed as illustrated in FIG. 9.

Figure 11:
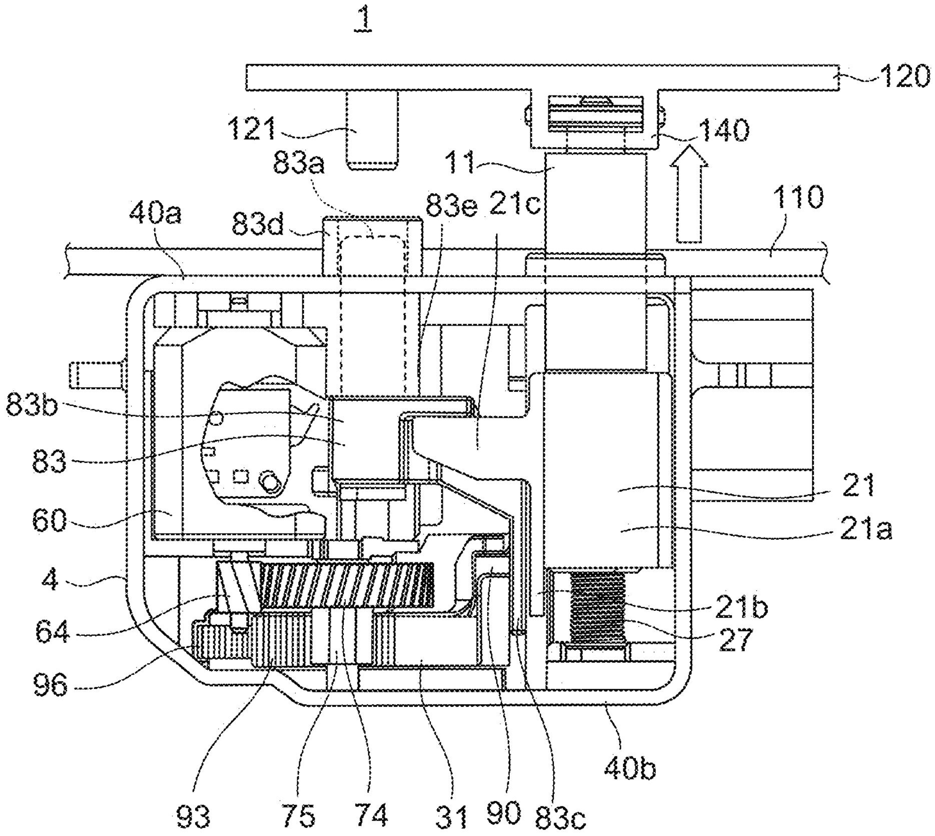
FIG. 11 illustrates a state of the forward/backward movement device when the fuel lid is opened.

Next, the operation of forward/backward movement device 1 when fuel lid 120 is opened will be described with reference to FIGS. 9 and 11. FIG. 11 illustrates a state of forward/backward movement device 1 when fuel lid 120 is opened. The forward direction of forward/backward movement member 11 is indicated by a hollow arrow in FIG. 11.

In a case where fuel lid 120 in the closed state illustrated in FIG. 9 is moved from the closed position to the open position, restriction member 90 can be separated from a side of forward/backward movement member 11 by driving driving part 60 or by manually using the driving mechanism (not illustrated) that generates a rotational force.

Thus, the leading-end part of restriction member 90 is pulled out from recessed part 21*b*1 formed in to-be-engaged member 21*b*, and the movement-restricted state in which the movement of forward/backward movement member 11 in the forward/backward direction is restricted is released. Forward/backward movement member 11 for which the movement-restricted state has been released in the above-described manner moves in the forward direction by the biasing force of biasing member 27. At this time, forward/ backward movement member 11 moves in the axial direction of forward/backward movement member 11 while rotating with respect to case 4.

Then, the rotation of forward/backward movement member 11 causes lid latching part 12 provided in the leading end of forward/backward movement member 11 to rotate as well, and the latching of lid latching part 12 to lid to-be-latched part 140 is released. Further, forward/backward movement member 11 pushes up fuel lid 120 by moving in the forward direction.

Pressing force transmitting member 83*a* is, on the other hand, held in the stop position by the frictional resistance applied by seal member 83*f* (see FIG. 5). Accordingly, as forward/backward movement member 11 moves in the forward direction, the gap between engagement member 83*e*, which extends from internal member 83*b* toward regulation member 21*a*, and to-be-engaged member 21*c*, which extends from regulation member 21*a* toward internal member 83*b*, becomes narrower, which eventually results in the engaged state between engagement member 83*e* and to-be-engaged member 21*c* that are engaged with each other as illustrated in FIG. 11. Since the biasing force generated by biasing member 27 is transmitted from forward/backward movement member 11 to pressing force transmitting member 83*a* thereby, pressing force transmitting member 83*a* moves together with forward/backward movement member 11.

Forward/backward movement member 11 moves further in the forward direction and reaches the forward position. Thus, fuel lid 120 is in the open state.

Further, pressing force transmitting member 83*a* moves together with forward/backward movement member 11, thereby moving to the protrusion position (forward position) in which pressing force transmitting member 83*a* protrudes outside case 4 from internal member 83*b*.

As described above, as illustrated in FIGS. 2, 9, and 11, in a case where fuel lid 120 is opened, to-be-engaged member 21*c* and engagement member 83*e* are in the engaged state by to-be-engaged member 21*c* moving a longer distance than engagement member 83*e*. Since the biasing force generated by biasing member 27 is transmitted from forward/backward movement member 11 to pressing force transmitting member 83*a* thereby, pressing force transmitting member 83*a* moves together with forward/backward movement member 11.

As has been described above, forward/backward movement device 1 according to the embodiment of the present invention as described above includes: case 4; forward/backward movement member 11 that includes one end, whose side is housed in case 4, and another end, whose side protrudes from case 4, moves forward in a direction from inside case 4 toward outside case 4, and moves backward in a direction from outside case 4 toward inside case 4; biasing member 27 that biases forward/backward movement member 11; movement member 31 that is housed in case 4 and moves between a first position, which allows forward/backward movement member 11 to move forward by a biasing force of biasing member 27, and a second position, in which forward/backward movement member 11 is stopped from moving forward; to-be-engaged member 21*c* that moves together with forward/backward movement member 11 inside case 4; pressing force transmitting member 83*a* that moves from a forward position to a backward position by a pressing force when fuel lid 120 is closed; and engagement member 83*e* that moves together with pressing force transmitting member 83*a* inside case 4. When forward/backward movement member 11 moves forward, engagement member 83*e* and to-be-engaged member 21*c* are in an engaged state such that the biasing force of biasing member 27 is applied to pressing force transmitting member 83*a*, and when pressing force transmitting member 83*a* is positioned in the backward position, engagement member 83*e* and to-be-engaged member 21*c* are in a non-engaged state such that the biasing force of biasing member 27 is not applied to pressing force transmitting member 83*a*.

With the configuration described above, when forward/backward movement member 11 moves forward, engagement member 83*e* and to-be-engaged member 21*c* are in the engaged state with each other and the biasing force of the biasing member is applied from forward/backward movement member 11 to pressing force transmitting member 83*a*, and thus, it is possible to move, together with forward/backward movement member 11, pressing force transmitting member 83*a* to the protrusion position (forward position) even without a special member for moving pressing force transmitting member 83*a* from the retraction position (backward position) to the protrusion position (forward position). Further, when forward/backward movement member 11 moves backward, engagement member 83*e* and to-be-engaged member 21*c* are in the non-engaged state with each other and the biasing force of the biasing member is not applied from forward/backward movement member 11 to pressing force transmitting member 83*a*, and thus, fuel lid 120 is not pressed by pressing force transmitting member 83*a*. Thus, it is possible to prevent fuel lid 120 from rising up from the vehicle body. Further, since a gap which allows a tool or the like to be inserted therethrough is not generated between fuel lid 120 having risen up from the vehicle body and the vehicle body, it is possible to enhance crime prevention performance.

Further, according to forward/backward movement device 1 according to the embodiment of the present invention, in a case where forward/backward movement member 11 moves backward in the direction from outside case 4 toward inside case 4, engagement member 83*e* and to-be-engaged member 21*c* are in the non-engaged state by to-be-engaged member 21*c* moving a longer distance than engagement member 83*e*. Since it is possible to cause engagement member 83*e* and to-be-engaged member 21*c* to be in the non-engaged state with each other with a simple configuration without adding any component for releasing the engaged state between engagement member 83*e* and to-be-engaged member 21*c* with each other, it is possible to reduce the manufacturing cost of forward/backward movement device 1.

Further, according to forward/backward movement device 1 according to the embodiment of the present invention, in a case where forward/backward movement member 11 moves forward in the direction from inside case 4 toward outside case 4, engagement member 83*e* and to-be-engaged member 21*c* are in the engaged state by to-be-engaged member 21*c* moving a longer distance than engagement member 83*e*. Since it is possible to cause engagement member 83*e* and to-be-engaged member 21*c* to be in the engaged state with each other with a simple configuration without adding any component for causing engagement member 83*e* and to-be-engaged member 21*c* to be in the engaged state with each other, it is possible to reduce the manufacturing cost of forward/backward movement device 1.

Further, forward/backward movement device 1 according to the embodiment of the present invention further includes: guide part 83*d* that guides forward and backward movement of pressing force transmitting member 83*a*; and seal member 83*f* that is disposed between pressing force transmitting member 83*a* and guide part 83*d* and has elasticity. Thus, it is possible to hold pressing force transmitting member 83*a* in the stop position more surely by the frictional resistance applied by seal member 83*f*, and further it is possible to hold engagement member 83*e* in the stop position more surely. As a result, it is possible to simplify the configuration of forward/backward movement device 1, whereby engagement member 83*e*, which is held in the stop position, and to-be-engaged member 21*c*, which moves together with forward/backward movement member 11, are caused to be in the engaged state with each other and, on the contrary, whereby engagement member 83*e* and to-be-engaged member 21*c* are caused to be in the non-engaged state with each other; it is possible to improve the reliability of forward/backward movement device 1; and it is possible to reduce the manufacturing cost of forward/backward movement device 1. Note that, seal member 83*f* described above is unnecessary in a case where a fit tolerance between pressing force transmitting member 83*a* and guide part 83*d* is set such that pressing force transmitting member 83*a* can be held in the stop position by the frictional resistance generated between pressing force transmitting member 83*a* and guide part 83*d*.

Note that, in the embodiment of the present invention, it is configured such that in a case where forward/backward movement member 11 moves backward, engagement member 83*e* and to-be-engaged member 21*c* are in the non-engaged state by to-be-engaged member 21*c* moving a longer distance than engagement member 83*e*, and such that in a case where forward/backward movement member 11 moves forward, engagement member 83*e* and to-be-engaged member 21*c* are in the engaged state by to-be-engaged member 21*c* moving a longer distance than engagement member 83*e*, but any configuration other than the above configuration example may be employed as long as the employed configuration has a structure that allows the engaged state between to-be-engaged member 21*c* and engagement member 83*e* to be switched to the non-engaged state therebetween in a predetermined position between the forward position and the backward position while forward/backward movement member 11 moves from the forward position to the backward position as well as the employed configuration has a structure that allows the non-engaged state between to-be-engaged member 21*c* and engagement member 83*e* to be switched to the engaged state therebetween in a predetermined position between the backward position and the forward position while forward/backward movement member 11 moves from the backward position to the forward position. For example, the employed configuration may have a structure provided with a cam mechanism which causes one member of to-be-engaged member 21*c* and engagement member 83*e*, where the movement direction of forward/backward movement member 11 is a direction of an axis thereof and the one member is rotatably provided around the axis, to be rotated in response to an operation when forward/backward movement member 11 moves, such that to-be-engaged member 21*c* and engagement member 83*e* are in the non-engaged state by rotating the one member from a predetermined position in response to the movement of forward/backward movement member 11 to the predetermined position, and such that engagement member 83*e* and to-be-engaged member 21*c* are in the engaged state by rotating the one member from a position, to which the one member has rotated, to the predetermined position in response to the movement of forward/backward movement member 11 to the forward position. Further, in the embodiment of the present invention, the device in which the lid opens by releasing the lock of the forward/backward movement member by the restriction member has been described as an example, but, for example, the present invention can also be used for a device including a so-called push-push mechanism in which a user performs a push operation to a lid, thereby causing a forward/backward movement member to move forward and backward between the open position and the closed position to open and close the lid.

It should be understood that the embodiment disclosed herein is illustrative and non-restrictive in every respect. The scope of the present invention is defined by the scope of the claims, rather than the description above, and is intended to include any modifications within the meaning and scope equivalent to the scope of the claims.

The embodiment of the present invention has been described thus far. Note that, the above description is only illustration of a preferred embodiment of the present invention, and the scope of the present invention is not limited thereto. That is, the descriptions of the configuration of the above-mentioned device and the shape of each part are exemplary, and it is obvious that various modifications and additions to these examples are possible within the scope of the present invention

INDUSTRIAL APPLICABILITY

The forward/backward movement device according to the present invention is useful as a device capable of preventing a lid from rising up from a vehicle body.

REFERENCE SIGNS LIST

- 1 Forward/backward movement device
- 2 Vehicle body
- 2*a* Fuel inlet part
- 4 Case
- 11 Forward/backward movement member
- 12 Lid latching part
- 21 Forward/backward movement member-side member
- 21*a* Regulation member
- 21*b* To-be-engaged member
- 21*c* To-be-engaged member
- 21*b*1 Recessed part
- 27 Biasing member
- 31 Movement member
- 40*a* Front-side wall part
- 40*b* Back-side wall part
- 60 Driving part
- 64 Rotation gear
- 74 Rotation gear
- 75 Pinion
- 80 Pressure force transmitting part
- 83 Regulation part
- 83*a* Pressing force transmitting member
- 83*b* Internal member
- 83*c* Regulation member
- 83*c*1 Recessed part
- 83*d* Guide part
- 83*e* Engagement member
- 83*f* Seal member
- 90 Restriction member
- 93 Rack gear
- 96 Biasing member
- 100 Opening and closing device
- 110 Body

120 Fuel lid
121 Projection
130 Hinge
140 Lid to-be-latched part
160 Screw cap

The invention claimed is:

1. A forward/backward movement device, comprising:

a case;

a forward/backward movement member that includes one end and another end, moves forward in a direction from inside the case toward outside the case, and moves backward in a direction from outside the case toward inside the case, a side of the one end being housed in the case, a side of the other end protruding from the case;

a biasing member that biases the forward/backward movement member;

a movement member that is housed in the case and moves between a first position and a second position, the first position allowing the forward/backward movement member to move forward by a biasing force of the biasing member, the second position being a position in which the forward/backward movement member is stopped from moving forward;

a to-be-engaged part that moves together with the forward/backward movement member inside the case;

a pressing force transmitting member that moves from a forward position to a backward position by a pressing force when a lid is closed; and an engagement part that moves together with the pressing force transmitting member inside the case, wherein:

when the forward/backward movement member moves forward, the engagement part and the to-be-engaged part are in an engaged state such that the biasing force of the biasing member is applied to the pressing force transmitting member, and when the pressing force transmitting member is positioned in the backward position, the engagement part and the to-be-engaged part are in a non-engaged state such that the biasing force of the biasing member is not applied to the pressing force transmitting member.

2. The forward/backward movement device according to claim 1, wherein in a case where the forward/backward movement member moves backward in the direction from outside the case toward inside the case, the engagement part and the to-be-engaged part are in the non-engaged state by the to-be-engaged part moving a longer distance than the engagement part.

3. The forward/backward movement device according to claim 1, wherein in a case where the forward/backward movement member moves forward in the direction from inside the case toward outside the case, the engagement part and the to-be-engaged part are in the engaged state by the to-be-engaged part moving a longer distance than the engagement part.

4. The forward/backward movement device according to claim 1, further comprising:

a guide part that guides forward and backward movement of the pressing force transmitting member; and a seal member that is disposed between the pressing force transmitting member and the guide part and has elasticity.

* * * * *